(12) United States Patent
Ramaprasad et al.

(10) Patent No.: US 12,197,495 B1
(45) Date of Patent: Jan. 14, 2025

(54) SYSTEM FOR RERANKING RETRIEVED MATCHING IMAGES

(71) Applicant: Infrrd Inc, San Jose, CA (US)

(72) Inventors: Yogananda Ganesh Kashyap Ramaprasad, Bengaluru (IN); Srirama R Nakshathri, Bangalore (IN)

(73) Assignee: Infrrd Inc

( * ) Notice: Subject to any disclaimer, the term of this patent is extended or adjusted under 35 U.S.C. 154(b) by 0 days.

(21) Appl. No.: 18/346,889

(22) Filed: Jul. 5, 2023

(51) Int. Cl.
*G06F 16/538* (2019.01)
*G06F 16/532* (2019.01)
*G06F 16/55* (2019.01)
*G06V 10/74* (2022.01)

(52) U.S. Cl.
CPC .......... *G06F 16/538* (2019.01); *G06F 16/532* (2019.01); *G06F 16/55* (2019.01); *G06V 10/761* (2022.01)

(58) Field of Classification Search
CPC ...... G06F 16/538; G06F 16/55; G06F 16/532; G06V 10/761
USPC ........................................................ 707/723
See application file for complete search history.

(56) References Cited

U.S. PATENT DOCUMENTS

| 9,721,186 | B2* | 8/2017 | Song | G06V 10/772 |
| 10,796,196 | B2* | 10/2020 | Song | G06V 10/464 |
| 2013/0060766 | A1* | 3/2013 | Lin | G06V 10/464 |
| | | | | 707/723 |
| 2013/0129223 | A1* | 5/2013 | Takacs | G06F 16/583 |
| | | | | 382/195 |
| 2015/0169638 | A1* | 6/2015 | Jaber | G06F 16/5854 |
| | | | | 707/749 |
| 2015/0278224 | A1* | 10/2015 | Jaber | G06F 16/583 |
| | | | | 707/758 |
| 2020/0334486 | A1* | 10/2020 | Joseph | G06T 5/20 |
| 2023/0196831 | A1* | 6/2023 | Xiong | G06V 20/30 |
| | | | | 382/103 |

* cited by examiner

*Primary Examiner* — Cam T Nguyen

(57) ABSTRACT

A system for re-ranking retrieved matching images. The system comprises a processor configured to extract at least one QI global feature from query image by global feature extractor module, and extract plurality of QI local features for the query image by local feature extractor module, and then search and retrieve top-k reference images from plurality of reference images based on at least one QI global feature and at least one KRI global feature associated with top-k reference images by filtering module. The processor is configured to perform matching of the plurality of QI local features with the plurality of KRI local features associated with the top-k reference images by fine tuning module and generate matching distance by distance fusion module, wherein the top-k reference images are re-ranked based on the matching distance and generate confidence score for the top-n reference images by confidence score generation module.

19 Claims, 8 Drawing Sheets

SYSTEM FOR RERANKING RETRIEVED MATCHING IMAGES

FIELD OF THE INVENTION

This application relates generally to the field of image matching. More particularly, the system relates to image matching wherein retrieved reference images are reranked to achieve accurate image matching.

BRIEF STATEMENT OF THE PRIOR ART

Image matching is a fundamental task in the field of computer vision, which aims to find correspondences between images or parts of images. It plays a crucial role in various applications such as object recognition, image retrieval, image stitching, copyright violation detection, and augmented reality. The process of image matching involves comparing image features or descriptors to identify similarities or matches between different images.

Traditionally, image matching algorithms relied on handcrafted feature extraction methods, such as SIFT (Scale-Invariant Feature Transform) or SURF (Speeded Up Robust Features), combined with techniques like RANSAC (Random Sample Consensus) for robustly estimating the geometric transformations between images. These methods have been widely adopted and have achieved significant success in many image matching applications. However, they have certain limitations, including computational inefficiency and sensitivity to image transformations such as changes in scale, rotation, and viewpoint.

With the advent of deep learning and the availability of large-scale annotated datasets, there has been a significant shift towards data-driven approaches for image matching. Convolutional Neural Networks (CNNs) have shown remarkable performance in various computer vision tasks, including image matching. Deep learning-based methods, such as Siamese networks or triplet networks, have been developed to learn discriminative image representations that capture semantic information and are invariant to various image transformations.

One of the key challenges in image matching is achieving robustness to changes in illumination, viewpoint, occlusion, and background clutter. Various techniques have been proposed to address these challenges, including the use of local feature descriptors, geometric constraints, and spatial verification methods. Additionally, recent advances in multi-modal matching have enabled the fusion of visual and textual information to enhance the accuracy and robustness of image matching algorithms.

Despite significant progress in image matching research, there is still a need for improved techniques that can handle large-scale image datasets efficiently, while maintaining high accuracy and robustness. Furthermore, there is a growing demand for real-time image matching systems that can operate on resource-constrained devices such as smartphones and embedded systems.

In this patent specification, we present a novel image matching approach that addresses the aforementioned challenges and provides an efficient and accurate solution for image matching tasks. Our method leverages the power of deep learning and incorporates innovative techniques for image matching, and verification of retrieved images. By combining the advantages of both data-driven and handcrafted approaches, our method achieves state-of-the-art performance while maintaining computational efficiency.

SUMMARY OF THE INVENTION

In an embodiment, a system for re-ranking retrieved matching images is disclosed. The system comprising one or more processors for executing one or more modules comprising a global feature extractor module, a local feature extractor module, a filtering module, a fine tuning module, a distance fusion module, and a confidence score generation module. The global feature extractor module is configured to extract at least one global feature from a query image, wherein the query image is received by a server. The local feature extractor module is configured to extract plurality of local features for the at least one global feature associated with the query image. The filtering module is configured to search and retrieve top-k reference images from a plurality of reference images. The plurality of reference images are stored on a database, wherein the database comprises at least one global feature and a plurality of local features associated with each of the plurality of reference images. The fine tuning module is configured to perform matching of the plurality of local features of the query image with the plurality of local features of the top-k reference images. The distance fusion module is configured to generate a matching distance, wherein the top-k reference images are re-ranked based on the matching distance. The confidence score generation module is configured to generate a confidence score for the top-n reference images, wherein n<k.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter.

However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1A:
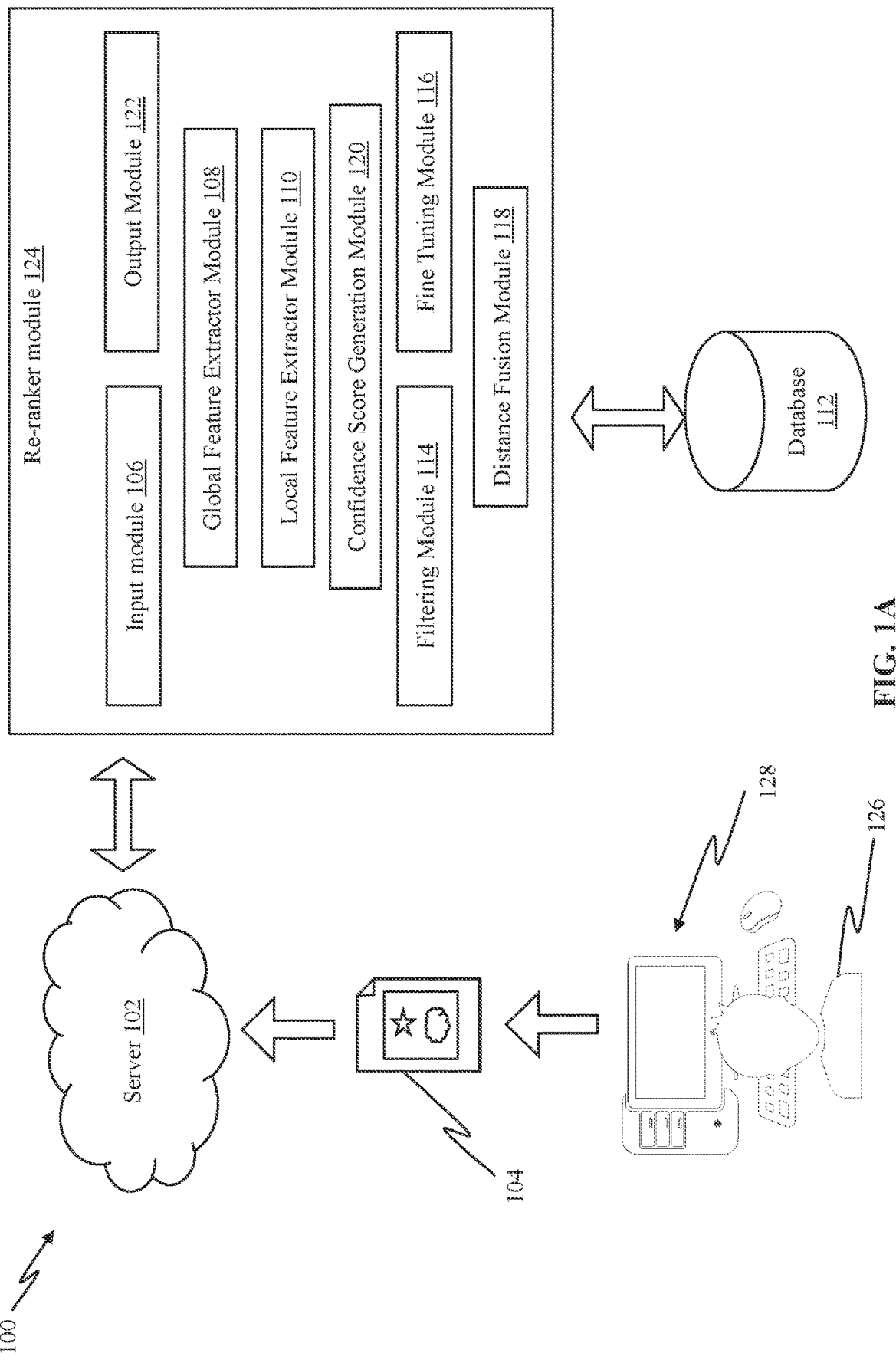
FIG. 1A illustrates a system 100 for re-ranking of matching images, in accordance with an embodiment.

FIG. 1A illustrates a system 100 for re-ranking of matching images, in accordance with an embodiment. The system 100 may comprise of a server 102, a database 112, a re-ranker module 124, one or more processors, a data processing system 128, and a user 126 associated with the data processing system 128.

In an embodiment, the server 102 may be configured to retrieve a query image 104 from the database 112.

In an embodiment, the server 102 may be configured to receive a query image 104 from the data processing system 128.

In an embodiment, the system 100 may be configured to receive an electronic document. Further, the system 100 may be configured to convert the document into an image by means of photocopying, scanning, and so on.

Figure 1B:
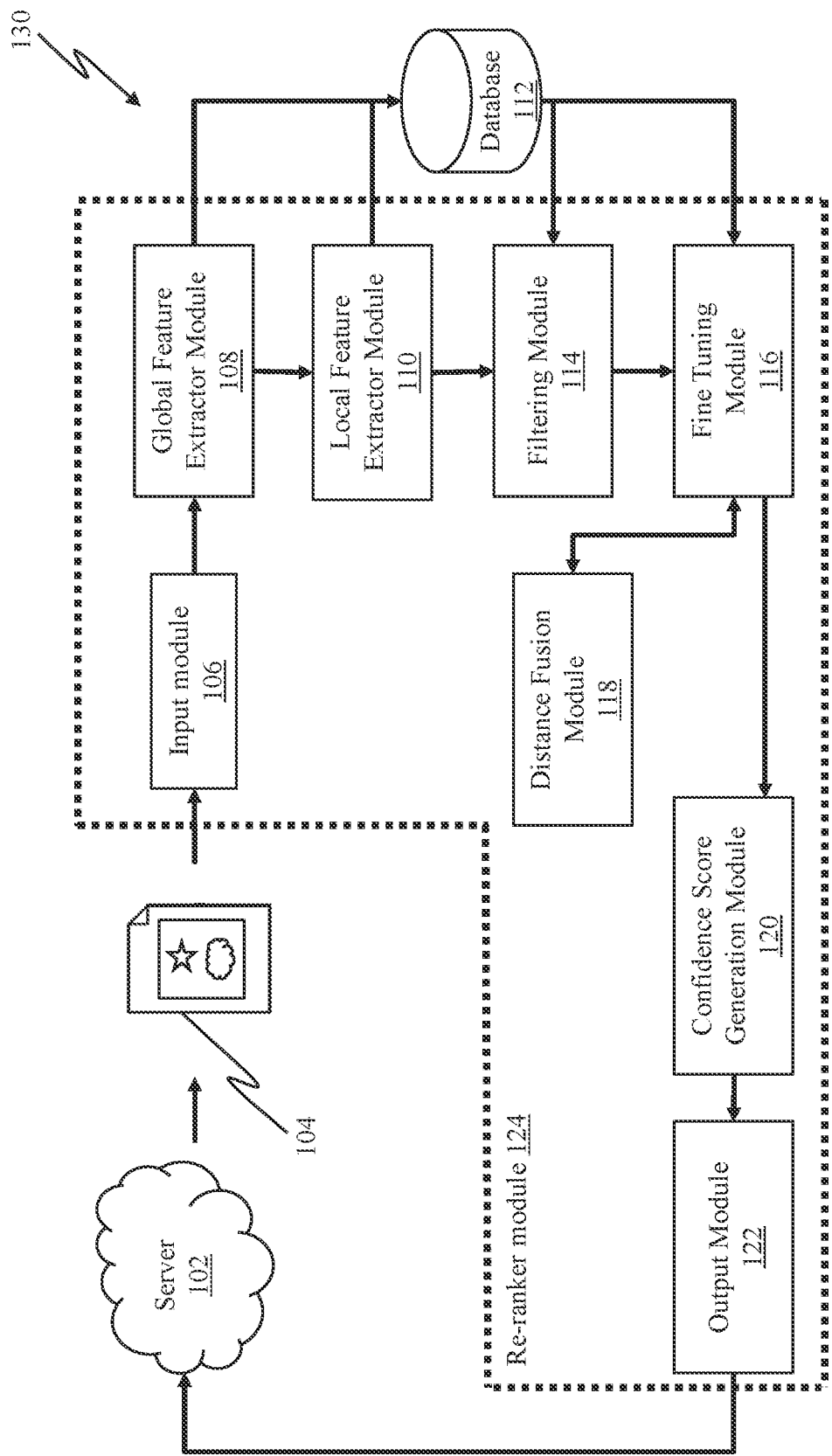
FIG. 1B illustrates a flowchart 130 between a server 102, a database 112, and a re-ranker module 124, in accordance with an embodiment.

FIG. 1B illustrates a flowchart 130 between the server 102, the database 112, and the re-ranker module 124, in accordance with an embodiment. The re-ranker module 124 may comprise of an input module 106, a global feature extractor module 108, a local feature extractor module 110, a database 112, a filtering module 114, a fine tuning module 116, a distance fusion module 118, a confidence score generation module 120, and an output module 122. The input module 106 may be configured to receive the query image 104. The global feature extractor module 108 may be configured to extract at least one Query Image (QI) global feature from the query image 104. The local feature extractor module 110 may be configured to extract plurality of QI local features for the at least one QI global feature associated with the query image 104.

In an embodiment, the filtering module 114 may be configured to search and retrieve top-k reference images from a plurality of reference images, wherein the plurality of reference images are stored on the database 112. The top-k reference images may be the top 'k' reference images from the plurality of reference images, wherein the top-k reference images are ranked in order.

In an embodiment, the plurality of reference images may be indexed. The plurality of reference images may be clustered according to predetermined categories.

In an embodiment, the database 112 may comprise of at least one Reference Image (RI) global feature and a plurality of RI local features associated with each reference image among the plurality of reference images.

Figure 2:
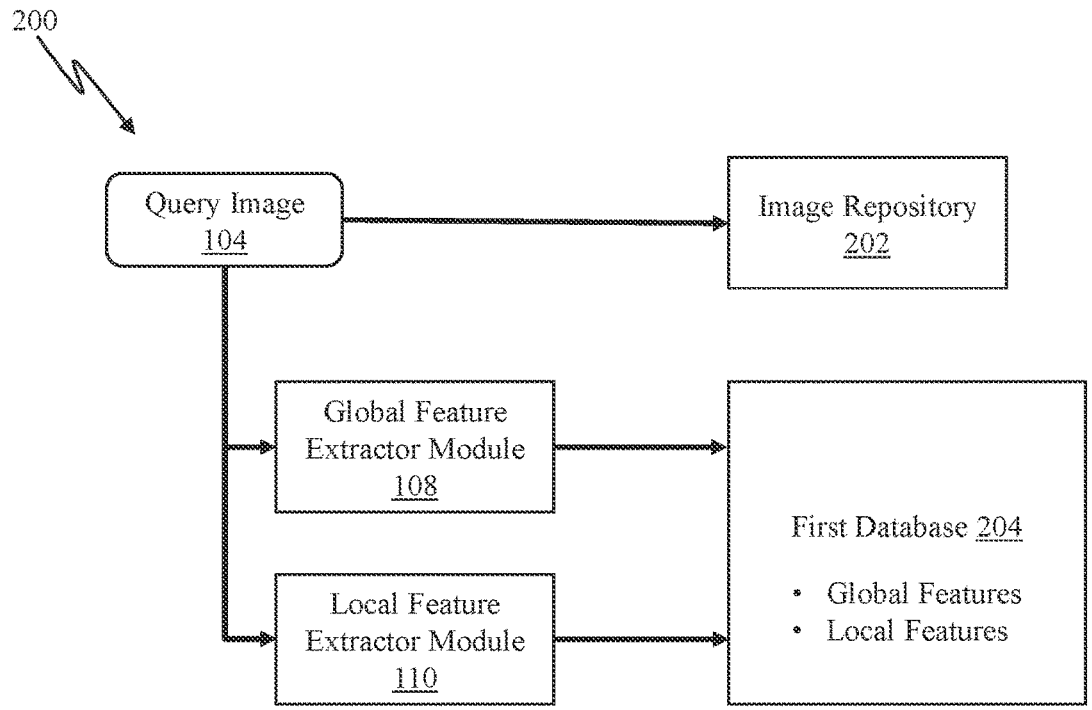
FIG. 2 illustrates a storage method 200 of a query image 104, in accordance with an embodiment.
Figure 5:
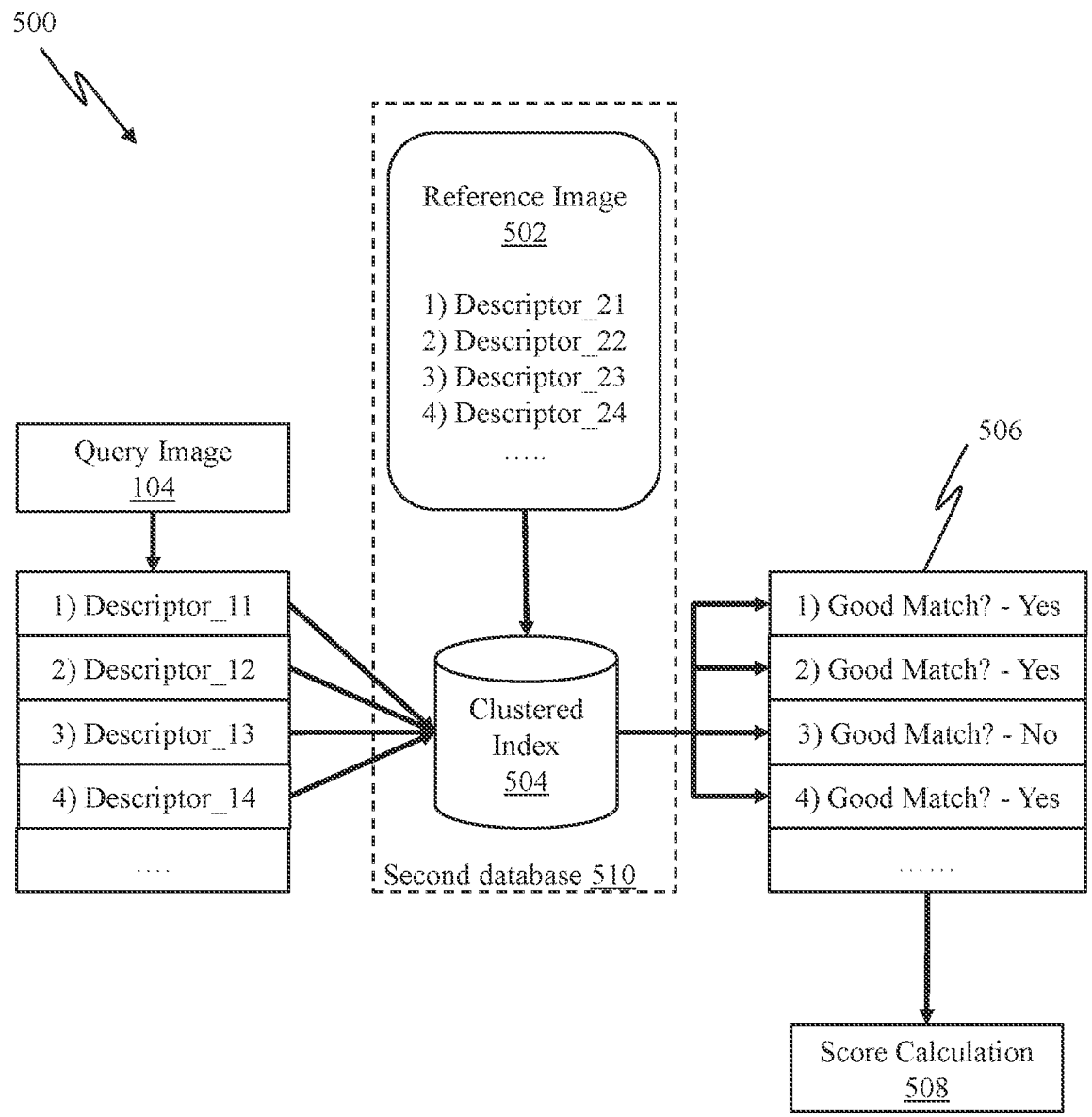
FIG. 5 illustrates a clustered local descriptor matching method 500, in accordance with an embodiment.

In an embodiment, the database 112 may comprise of an image repository 202, a first database 204, and a second database 510 (refer FIGS. 2 and 5).

In an embodiment, the image repository 202 may comprise of the plurality of reference images. The plurality of reference images may be stored in the first database 204. The first database 204 may be configured to store at least one QI global feature, at least one RI global feature of each of the plurality of the reference images, the plurality of QI local features, and plurality of RI local features. The second database 510 may be configured to store plurality of top-k Reference Image (KRI) local features, wherein the plurality of KRI local features may be associated with the top-k reference images. The plurality of KRI local features may be stored in a clustered index.

In an embodiment, the image repository 202 may be, but not limited to, on the first database 204.

In an embodiment, the fine tuning module 116 may be configured to perform matching of the plurality of QI local features with the plurality of KRI local features are associated with the top-k reference images. The distance fusion module 118 may be configured to generate a matching distance 616 (refer FIG. 6), wherein the top-k reference images are re-ranked based on the matching distance 616. The confidence score generation module 120 may be configured to generate a confidence score for the top-n reference images, wherein n<k. The value of 'k' of the top-k reference images may be predetermined by the system based on the instructions received from a user, and the value of 'n' of the top-n reference images may be predetermined by the system based on the instructions received from the user.

In an embodiment, the value of 'k' may be 10 and the value of 'n' may be 2.

In an embodiment, the confidence score generation module 120 may be configured to generate a confidence score for the top-n reference images.

In an embodiment, the confidence score generation module 120 may be configured to generate a confidence score for the top-2 reference images. The output module 122 may be configured to output top-2 reference images, wherein the confidence score of the top-2 reference images is equal to or higher than a confidence threshold.

FIG. 2 illustrates a storage method 200 of the query image 104, in accordance with an embodiment. The received query image 104 may be stored in the image repository 202.

In an embodiment, the global feature extractor module 108 may be configured to extract at least one QI global feature. The local feature extractor module 110 may be configured to extract plurality of QI local features. The extracted at least one QI global feature and the plurality of QI local features may be stored in the first database 204.

Figure 3:
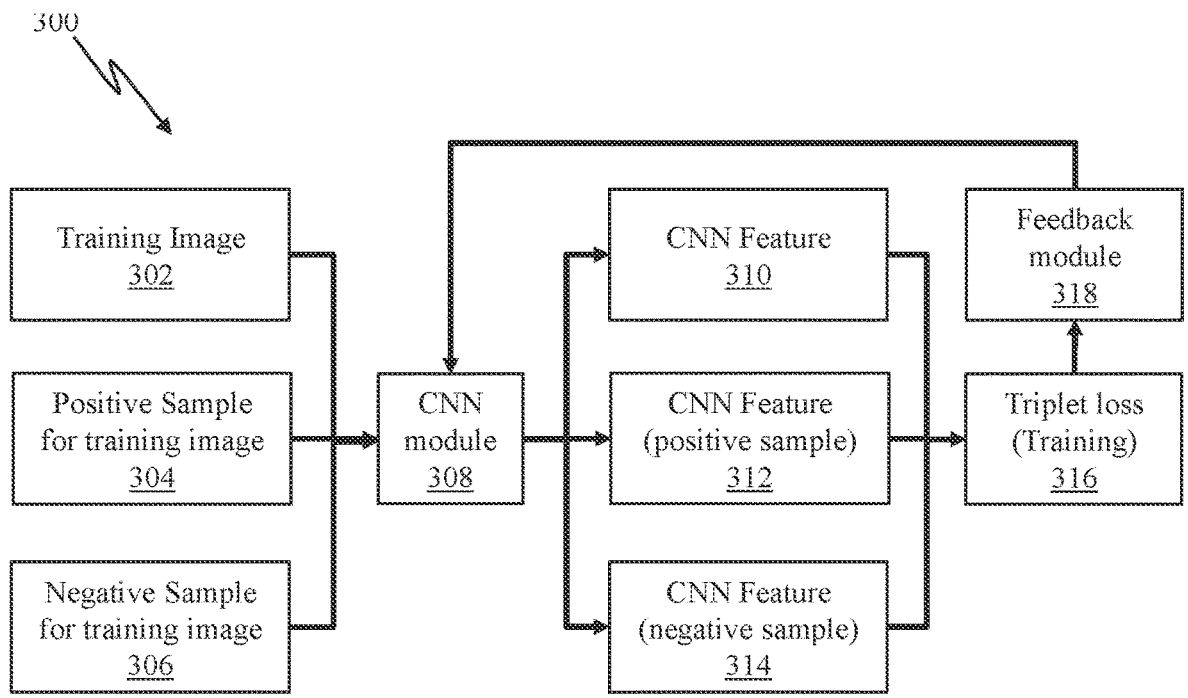
FIG. 3 illustrates a training phase 300 for a CNN module 308, in accordance with an embodiment.

FIG. 3 illustrates a training phase 300 for a CNN module 308, in accordance with an embodiment.

In an embodiment, the global feature extractor module 108 may comprise of an image resizer and a CNN module 308. The global feature extractor module 108 may be configured to receive the query image 104. The image resizer may be configured to resize the query image 104 to 224×224.

In an embodiment, the CNN module may employ Siamese approach to calculate a triplet loss.

In an embodiment, the at least one QI global feature, the at least one RI global feature, and the at least one KRI global feature may be 1×1024 sized vectors, wherein the vectors are stored on the database 112.

In an embodiment, distance between the vectors may be calculated using a cosine similarity method.

In an embodiment, the CNN module 308, during a training phase 300, may be configured to receive a training image 302, a positive sample image 304 for the training image 302, and a negative sample image 306 for the training image 302.

In an embodiment, the CNN module 308 may be configured to extract at least one T global feature for the training image 302, at least one P global feature for the positive sample image 304, and at least one N global feature for the negative sample image 306.

In an embodiment, the CNN module 308 may be configured to generate a closer distance between the training image 302 and the positive sample image 304 based on the at least one T global feature and the at least one P global feature. Further the CNN module 308 may be configured to generate a farther distance between the training image 302 and the negative sample image 306 based on the at least one T global feature and the at least one N global feature. A triplet loss 316 may be calculated based on said distances, which may be fed back to the CNN module 308 through a feedback module 318. The CNN module 308 may adjust weights of the CNN module 308 based on the triplet loss 316. Training phase 300 may be stopped when the difference in the training loss 316 is negligible.

In an embodiment, the CNN module 308 may be configured to reduce the closer distance and increase the farther distance by adjusting the weights of the CNN module 308, wherein weights may be the parameters defining the calculation of the closer distance and the farther distance, i.e., the closer distance and the farther distance may be a function of weights.

In an embodiment, the local feature extractor module 110 may be configured to extract plurality of key points and plurality of QI local features for the query image. There may be hundreds and thousands of local feature descriptors in an image.

In an embodiment, the plurality of QI local features, the plurality of RI local features and the plurality of KRI local features may be obtained using BRISK method.

Figure 4:
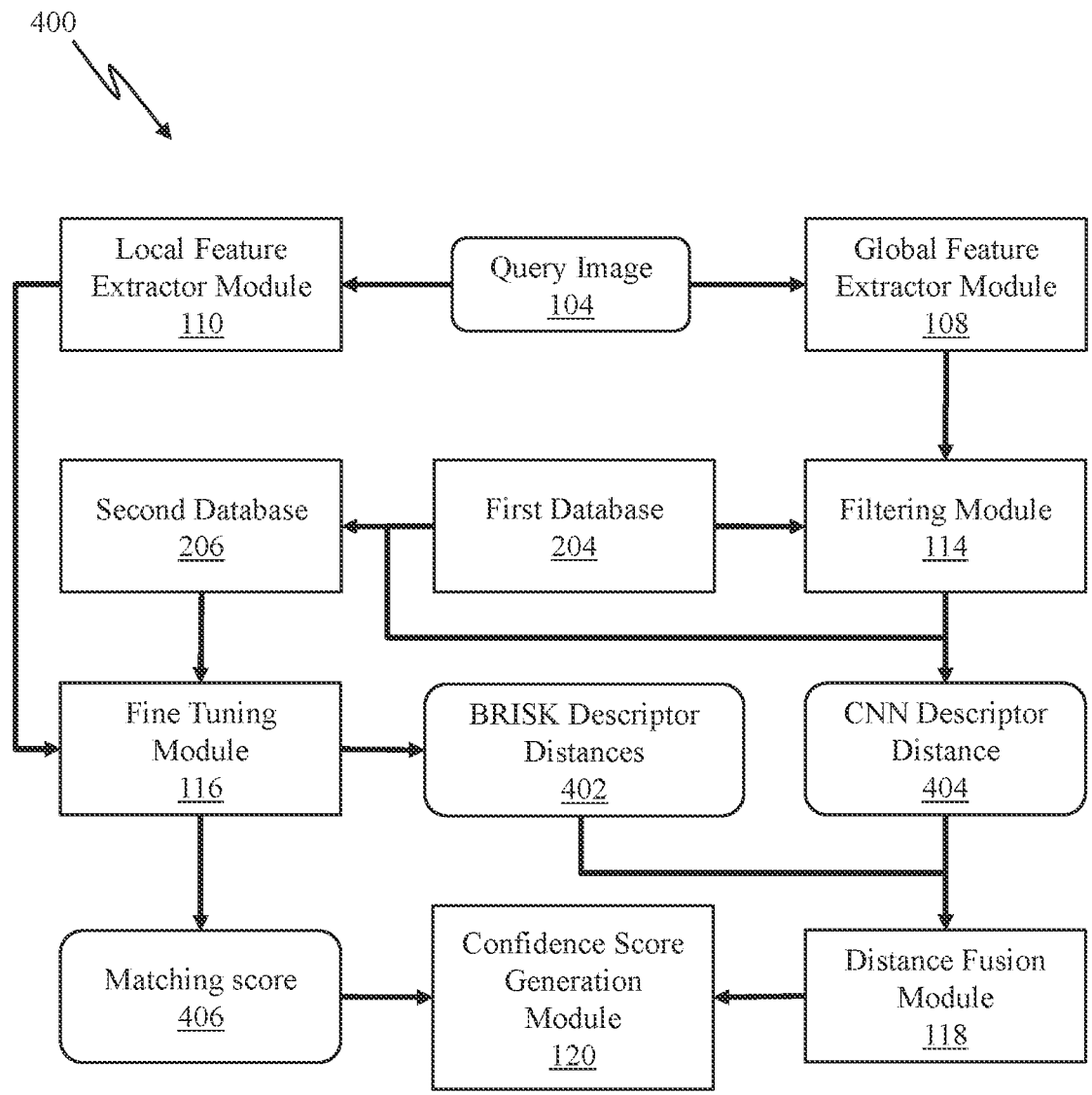
FIG. 4 illustrates a method 400 utilised to generate a confidence score, in accordance with an embodiment.

FIG. 4 illustrates a method 400 utilised to generate the confidence score, in accordance with an embodiment.

In an embodiment, the filtering module 114 may be configured to receive the at least one QI global feature from the global feature extractor module 108. The filtering module 114 may be configured to retrieve the plurality of reference images from the first database 202. The stored global features may be indexed to accelerate the search. The indexed database may use locality-sensitive hashing (LSH) to store the closest vectors in a cluster form to reduce the load time while searching.

In an embodiment, the filtering module 114 may be configured to generate a CNN descriptor distance 404, wherein the CNN descriptor distance 404 is the distance between the at least one QI global feature and the at least one RI global feature of one reference image from the plurality of reference images. The CNN descriptor distance 404 may be calculated for each of the plurality of reference images with respect to the query image 104.

In an embodiment, the plurality of reference images may be ranked. The top-k reference images may be selected, by the filtering module 114, from the plurality of reference images based on the plurality of CNN descriptor distances 404.

FIG. 5 illustrates a clustered local descriptor matching method 500, in accordance with an embodiment.

In an embodiment, the second database 510 may be configured to cluster and index before storing the plurality of KRI local features. The fine tuning module 116 may be configured to retrieve clustered plurality of KRI local features, wherein the each of the clustered KRI local features comprises of at least one local feature from the plurality of KRI local features.

In an embodiment, the second database 510 may be configured to store the plurality of clustered KRI local features in a clustered index 504. The fine tuning module 116 may be configured to calculate a BRISK descriptor distance, wherein the BRISK descriptor distance is the difference between the vectors associated with one of the plurality of QI local features and one of the local features from the clustered KRI local features.

The fine tuning module 116 may be configured to perform matching of one of the plurality of QI local features with the clustered KRI local features, wherein the BRISK descriptor distances are calculated for the one QI local feature and the top-2 KRI local features from the clustered KRI local features.

In an embodiment, at 506, if the value of BRISK descriptor distance is below or equal to a fine tuning threshold, the local feature may be considered to be a good match, else, the local feature may be considered to be not a good match.

In an embodiment, a score calculation module 508 may be configured to count the number of good matches obtained for the plurality of QI local features and the clustered KRI local features compared. The fine tuning module 116 may output a matching score 406, wherein matching score 406 is the said count.

Referring to FIG. 4, the distance fusion module 118 may be configured to receive a set of BRISK descriptor distances 402 generated between each of the plurality of QI local features and top-1 local feature from the clustered KRI local features associated with one of the reference image 502 from the plurality of reference images. The distance fusion module 118 may further be configured to generate the matching distance 616. The matching distance 616 is calculated based on the CNN descriptor distance and the set of BRISK descriptor distances, wherein the CNN descriptor distance is calculated between the at least one QI global feature and at least one global feature associated with the reference image 502. Upon generating the matching distance 616, the fine tuning module 116 may be configured to re-rank the top-k reference images based on the matching distance 616 and output the top-2 reference images from the re-ranked top-k reference images.

Figure 6:
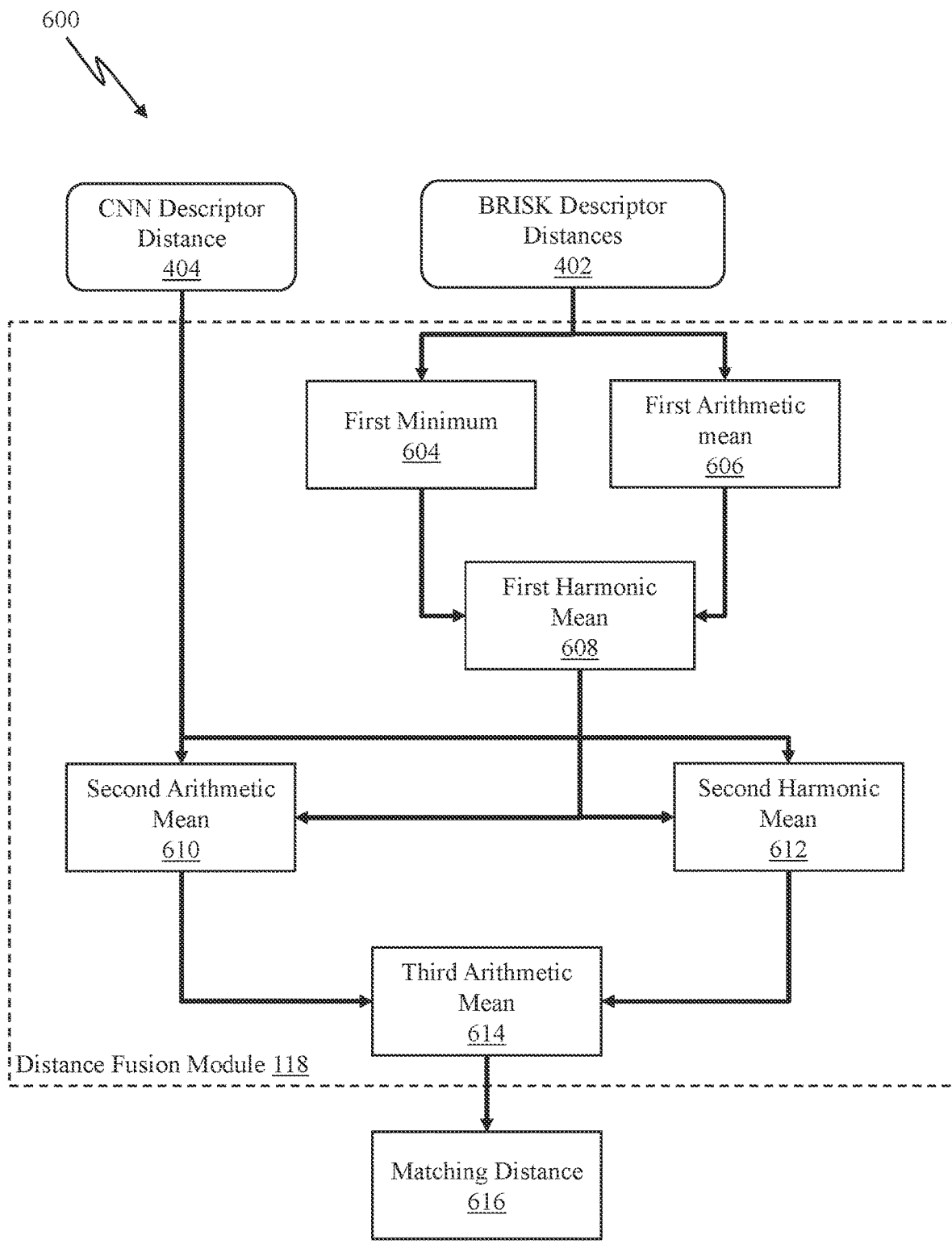
FIG. 6 illustrates a distance fusion module 118, in accordance with an embodiment.

FIG. 6 illustrates the distance fusion module 118, in accordance with an embodiment. The distance fusion module 118 may be configured to receive the CNN Descriptor Distance 404 and set of BRISK Descriptor Distances 402. The distance fusion module 118 may determine a first minimum from the plurality of BRISK descriptor distances. Further, the distance fusion module 118 may calculate a first arithmetic mean 606 from the plurality of BRISK descriptor distances 602. A first harmonic mean 608 may be calculated based on the first minimum 604 and the first arithmetic mean 606. A second arithmetic mean 610 may be calculated based on the first harmonic mean 608 and the CNN descriptor distance 404. A second harmonic mean 612 may be calculated based on the first harmonic mean 608 and the CNN descriptor distance 404. Finally, a third arithmetic mean 614 may be determined from the second arithmetic mean 610 and the second harmonic mean 612 to determine a matching distance 616.

In an embodiment, top-k reference images may be re-ranked based on the calculated matching distance 616.

In an embodiment, the fine tuning module 116 may be configured to select top-2 reference images from the re-ranked top-k reference images and output the top-2 reference images to the confidence score generation module 120.

Figure 7:
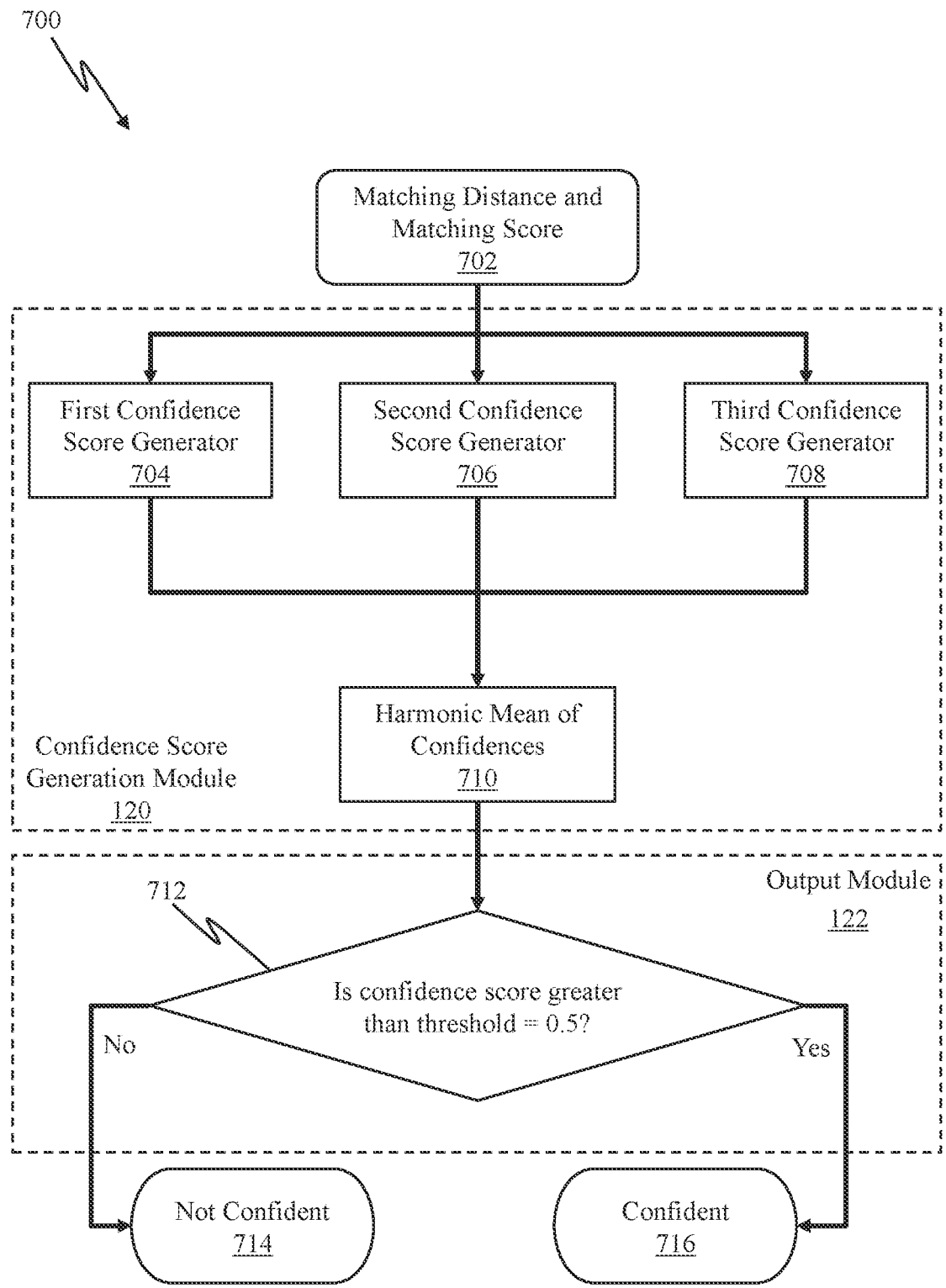
FIG. 7 illustrates a confidence score generation module 120 and an output module 122, in accordance with an embodiment.

FIG. 7 illustrates the confidence score generation module 120 and the output module 122, in accordance with an embodiment. The confidence score generation module 120 may be configured to receive the matching distance 616 and the matching score 406.

In an embodiment, the confidence score generation module 120 comprises a first confidence score generator 704, a second confidence score generator 706, and a third confidence score generator 708. The first confidence score generator 704 may be configured to generate a confidence score based on the matching score 406. The second confidence score generator 706 may be configured to calculate a second confidence score based on the difference between the matching distances 616 calculated for a first reference image and a second reference image. The first reference image may be the top image from the top-2 reference images received from the fine tuning module 116. Further, the second reference image may be the second from top image from the top-2 reference images received from the fine tuning module 116.

In an embodiment, the third confidence score generator 708 may be configured to determine a third confidence score based on the matching distance 616. The confidence score generation module 120 may be configured to determine a harmonic mean of confidences 710 based on the first confidence score, the second confidence score, and the third confidence score.

In an embodiment, the output module 122 may be configured to receive the harmonic mean of confidences 710 and determine if the confidence score is above, equal, or below the confidence threshold. If the confidence score is lower than 0.5, the output module 122 may output the relevant reference image along with a label 'not confident' 714. If the confidence score is equal to or higher than 0.5, the output module 122 may output the relevant reference image along with a label 'confident' 716.

Having explained the technology in greater detail in the foregoing, a method for re-ranking retrieved matching images by a system comprising one or more processors is now provided below.

Figure 8:
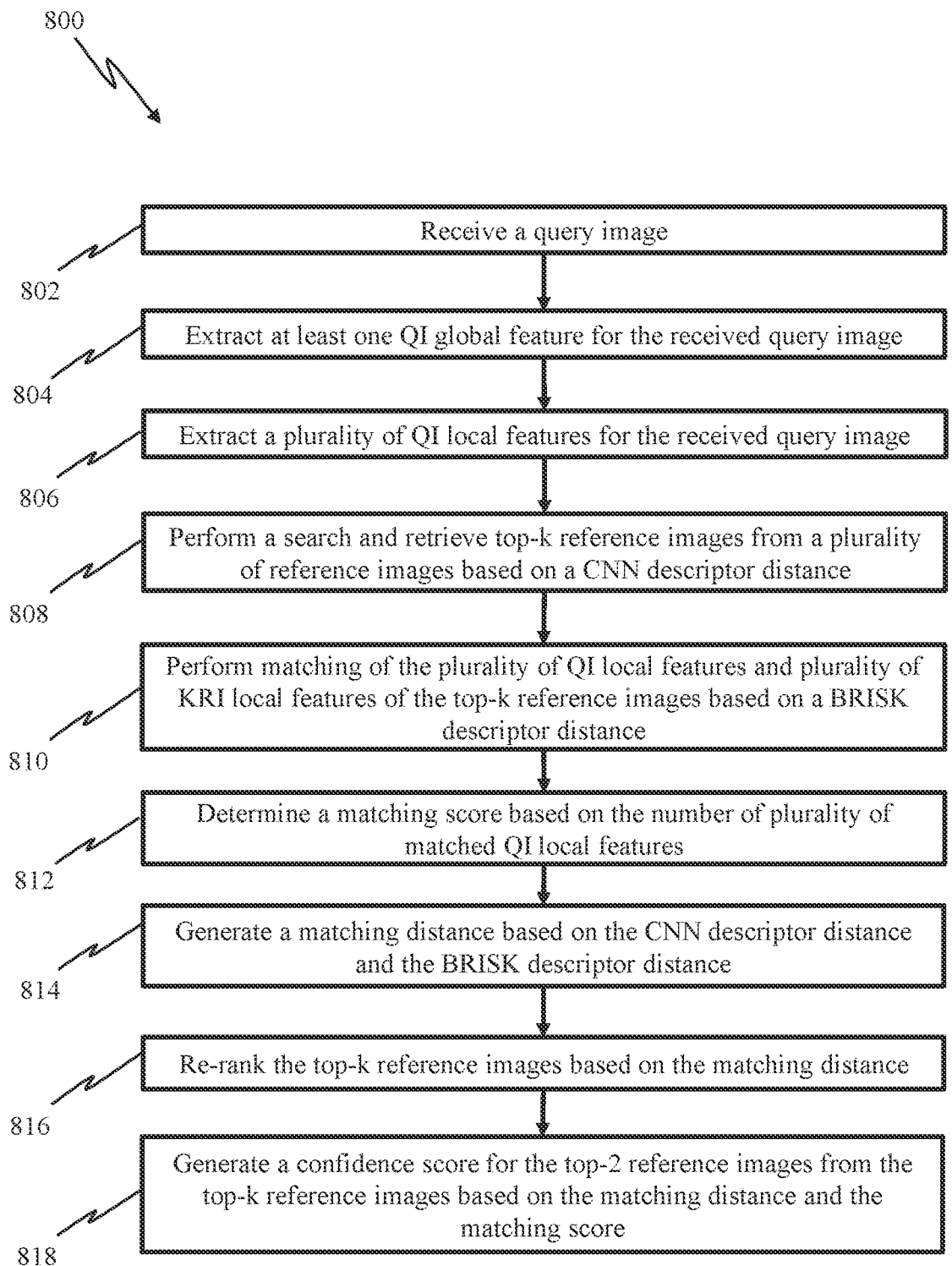
FIG. 8 illustrates a flowchart 800 for re-ranking matching images, in accordance with an embodiment.

FIG. 8 illustrates a flowchart 800 depicting a method for re-ranking matching images, in accordance with an embodiment. At step 802, the input module 106 is configured to receive a query image 104.

At step 804, the global feature extractor module 108 is configured to extract at least one QI global feature for the received query image 104.

At step 806, the local feature extractor module 110 is configured to extract a plurality of QI local features for the received query image 104.

At step 808, the filtering module 114 is configured to perform a search and retrieve top-k reference images from a plurality of reference images based on a CNN descriptor distance 404.

At step 810, the fine tuning module 116 is configured to perform matching of the plurality of QI local features and plurality of KRI local features of the top-k reference images based on a BRISK descriptor distance.

At step 812, the fine tuning module 116 is configured to determine a matching score 406 based on the number of plurality of matched QI local features.

At step 814, the distance fusion module 118 is configured to generate a matching distance 616 based on the CNN descriptor distance 404 and the BRISK descriptor distance.

At step 816, the fine tuning module 116 is configured to re-rank the top-k reference images based on the matching distance 616.

At step 818, the confidence score generation module 120 is configured to generate a confidence score for the top-2 reference images from the top-k reference images based on the matching distance 616 and the matching score 406.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for generating confidence score for retrieved matching images, the system comprising one or more processors configured to:
    extract, by a global feature extractor module, at least one Query Image (QI) global feature from a query image, wherein the query image is received by a server;
    extract, by a local feature extractor module, plurality of QI local features for the at least one QI global feature associated with the query image;
    search and retrieve, by a filtering module, top-k reference images from a plurality of reference images based on the at least one QI global feature and at least one top-k Reference Image (KRI) global feature, wherein the at least one KRI global feature is associated with the top-k reference images;
    perform matching, by a fine tuning module, of the plurality of QI local features with plurality of clustered KRI local features of the top-k reference images, wherein each of the clustered KRI local features comprises plurality of KRI local features;
    generate, by a distance fusion module, a matching distance, wherein the distance fusion module is configured to:
        receive a Convolutional Neural Networks (CNN) descriptor distance generated between the at least one QI global feature and the at least one KRI global feature; and
        receive a set of Binary Robust Invariant Scalable Keypoints (BRISK) descriptor distances generated between each of the plurality of QI local features and top-2 local features of each of the clustered KRI local features associated with one of the reference images from the plurality of reference images,
    wherein:
        the matching distance is calculated based on the CNN descriptor distance and the set of BRISK descriptor distances; and
        the fine tuning module, upon generating the matching distance, is configured to:
            re-rank the top-k reference images based on the matching distance; and output top-n reference images from the re-ranked top-k reference images; and
generate, by a confidence score generation module, a confidence score for the top-n reference images, wherein n<k.

2. The system according to claim 1, wherein the system is configured to receive an electronic document, wherein at least one page of the document is converted to an image.

3. The system according to claim 1, wherein the system comprises:
an input module configured to receive the query image; and
an output module configured to output the top-n reference images, wherein the confidence score of the top-n reference images is equal or higher than a confidence threshold.

4. The system according to claim 3, wherein the plurality of reference images are stored on a database, wherein the database comprises at least one Reference Image (RI) global feature and a plurality of RI local features associated with each of the plurality of reference images, wherein the database comprises:
a first database configured to store the query image, the plurality of reference images, at least one QI global feature, plurality of at least one RI global feature, at least one KRI global feature, the plurality of QI local features, and the plurality of RI local features; and
a second database configured to store the plurality of KRI local features, wherein the plurality of KRI local features are stored in a clustered index.

5. The system according to claim 4, wherein the global feature extractor module comprises:
an image resizer configured to resize the query image; and
a CNN module configured to extract at least one global feature for the query image.

6. The system according to claim 5, wherein during a training phase, the CNN module is configured to:
receive a training image;
receive a positive sample image for the training image;
receive a negative sample image for the training image, wherein the positive sample image and the negative sample image are selected from the plurality of reference images;
extract at least one T global feature for the training image;
extract at least one P global feature for the positive sample image;
extract at least one N global feature for the negative sample image;
calculate a closer distance between the training image and the positive sample image based on the at least one T global feature and the at least one P global feature;
calculate a farther distance between the training image and the negative sample image based on the at least one T global feature and the at least one N global feature;
calculate a triplet loss based on the closer distance and the farther distance; and
update weights of the CNN module based on the triplet loss calculated.

7. The system according to claim 6, wherein the closer distance and the farther distance are calculated using a cosine similarity method, wherein vector size of the at least one T global feature, the at least one P global feature, and the at least one N global feature is 1×1024.

8. The system according to claim 4, wherein the local feature extractor module is configured to extract the plurality of QI local features of the query image using a BRISK method.

9. The system according to claim 4, wherein the filtering module is configured to:
receive the at least one QI global feature and the plurality of at least one RI global feature;
generate the CNN descriptor distance, wherein the CNN descriptor distance is generated for the at least one QI global feature and each of the at least one RI global feature; and
retrieve the top-k reference images from the plurality of reference images, wherein plurality of reference images are indexed based on the CNN descriptor distance.

10. The system according to claim 9, wherein the fine tuning module is configured to:
receive the plurality of QI local features and the plurality of KRI local features, wherein the plurality of KRI local features are associated with the top-k reference images;
cluster and index the plurality of KRI local features to generate a plurality of clustered KRI local features;
perform matching of one of the plurality of QI local features with the clustered KRI local features, wherein a BRISK descriptor distance is calculated for each of the plurality of QI local features and the top-2 KRI local features from the clustered KRI local features, wherein:
the QI local feature is a good match, if the BRISK descriptor distance is below or equal to a fine tuning threshold; and
the QI local feature is discarded, if the BRISK descriptor distance is above the fine tuning threshold; and
output a matching score, wherein the matching score is the count of matched local features.

11. The system according to claim 10, wherein the distance fusion module is configured to generate the matching distance by a method comprising steps of:
determining a first minimum from the set of BRISK descriptor distances associated with the query image and one reference image from the top-k reference images;
calculating a first arithmetic mean for the set of BRISK descriptor distances;
calculating a first harmonic mean based on the first minimum and the first arithmetic mean;
calculating a second arithmetic mean and a second harmonic mean, wherein:
the second arithmetic mean is calculated based on the CNN descriptor distance received for each of the top-k reference images and the first harmonic mean; and
the second harmonic mean is calculated based on the CNN descriptor distance received for each of the top-k reference images and the first harmonic mean;
calculating a third arithmetic mean based on the second arithmetic mean and the second harmonic mean; and
outputting the third arithmetic mean as the matching distance.

12. The system according to claim 11, wherein the confidence score generation module comprises a first confidence score generator, a second confidence score generator, and a third confidence score generator, wherein:
the first confidence score generator is configured to generate a first confidence score;
the second confidence score generator is configured to generate a second confidence score;
the third confidence score generator is configured to generate a third confidence score; and the confidence score generation module is configured to generate a final confidence score based on the first confidence score, the second confidence score, and the third confidence score.

13. The system according to claim 12, wherein the final confidence score is a harmonic mean of the first confidence score, the second confidence score, and the third confidence score.

14. The system according to claim 12, wherein the first confidence score generator is configured to generate the first confidence score based on the matching score.

15. The system according to claim 14, wherein the second confidence score generator is configured to generate the second confidence score based on the difference between the matching distance of a first reference image and the query image, and the matching distance of a second reference image and the query image, wherein:
the first reference image is the top image among the top-2 images; and
the second reference image is second from the top image among the top-2 images.

16. The system according to claim 15, wherein the third confidence score generator is configured to generate the third confidence score based on the matching distance.

17. The system according to claim 16, wherein:
the output module is configured to output as 'confident', if the final confidence score is higher or equal than the confidence threshold; and
the output module is configured to output as 'not confident', if the final confidence score is lower than the confidence threshold.

18. The system according to claim 4, wherein:
the value of 'k' of the top-k reference images is predetermined by the system based on the instructions received from a user; and
the value of 'n' of the top-n reference images is predetermined by the system based on the instructions received from the user.

19. A method for generating confidence score for retrieved matching images by a system comprising one or more processors, the method comprising:
receiving, by an input module, a query image;
extracting, by a global feature extractor module, at least one Query Image (QI) global feature for the received query image;
extracting, by a local feature extractor module, plurality of QI local features for the received query image;
performing a search and retrieving top-k reference images, by a filtering module, from a plurality of reference images based on a Convolutional Neural Networks (CNN) descriptor distance;
performing matching, by a fine tuning module, of the plurality of QI local features and plurality of clustered top-k Reference Image (KRI) local features of the top-k reference images based on a Binary Robust Invariant Scalable Keypoints (BRISK) descriptor distance, wherein each of the clustered KRI local features comprises plurality of KRI local features;
determining a matching score based on the number of plurality of matched QI local features;
generating a matching distance, by a distance fusion module, based on the CNN descriptor distance and the BRISK descriptor distance, wherein the distance fusion module is configured to:
receive the CNN descriptor distance generated between the at least one QI global feature and the at least one KRI global feature; and
receive a set of BRISK descriptor distances generated between each of the plurality of QI local features and top-2 local features of each of the clustered KRI local features associated with one of the reference image from the plurality of reference images, wherein the matching distance is calculated based on the CNN descriptor distance and the set of BRISK descriptor distances;
re-ranking the top-k reference images, by the fine tuning module, based on the matching distance; and
generating a confidence score, by a confidence score generation module, for the top-2 reference images from the top-k reference images based on the matching distance and the matching score.

\* \* \* \* \*